US007011865B2

(12) United States Patent
Sengupta et al.

(10) Patent No.: US 7,011,865 B2
(45) Date of Patent: Mar. 14, 2006

(54) SPRAYABLE MINING LINER

(75) Inventors: Ashok Sengupta, London (CA); Jiangdong Tong, London (CA)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/236,541

(22) Filed: Sep. 6, 2002

(65) Prior Publication Data

US 2003/0125472 A1  Jul. 3, 2003

Related U.S. Application Data

(63) Continuation-in-part of application No. 09/952,150, filed on Sep. 11, 2001, now abandoned.

(51) Int. Cl.
B05D 5/00 (2006.01)
C08L 75/00 (2006.01)
B32B 9/00 (2006.01)

(52) U.S. Cl. .................. 427/243; 405/150.1; 405/267; 405/268; 405/272; 405/284; 405/287.1; 427/256; 428/220; 523/130; 523/131; 524/500; 524/507; 524/591

(58) Field of Classification Search ............... 524/507, 524/500, 591; 523/130, 131; 427/243, 256; 405/150.1, 267, 268, 272, 284, 287.1; 428/220
See application file for complete search history.

(56) References Cited

U.S. PATENT DOCUMENTS

| | | |
|---|---|---|
| 3,183,112 A | 5/1965 | Gemassmer |
| 3,248,372 A | 4/1966 | Bunge |
| 3,384,624 A | 5/1968 | Heiss |
| 3,502,500 A | 3/1970 | Hoock |
| 3,756,845 A | 9/1973 | Zasadny et al. |
| 3,883,577 A | 5/1975 | Rabizzoni et al. |
| 3,892,442 A | 7/1975 | Janssen |
| 3,933,514 A | 1/1976 | Banks et al. |
| 3,992,316 A | 11/1976 | Pedain et al. |
| 4,036,024 A | 7/1977 | Dreker et al. |
| 4,043,950 A | 8/1977 | Wilmsen et al. |
| 4,061,662 A | 12/1977 | Marans et al. |
| 4,066,578 A | 1/1978 | Murch et al. |
| 4,095,985 A | 6/1978 | Brown |
| 4,097,400 A | 6/1978 | Wortmann et al. |
| 4,102,138 A | 7/1978 | Dreker et al. |
| 4,107,376 A | 8/1978 | Ishikawa |
| 4,113,014 A | 9/1978 | Kubens et al. |
| 4,119,602 A | 10/1978 | Isgur et al. |
| 4,142,030 A | 2/1979 | Dieterich et al. |
| 4,230,822 A | 10/1980 | Murch et al. |
| 4,237,182 A | 12/1980 | Fulmer et al. |
| 4,254,177 A | 3/1981 | Fulmer et al. |
| 4,261,670 A | 4/1981 | Paban |
| 4,269,628 A | 5/1981 | Ballard et al. |
| 4,315,703 A | 2/1982 | Gasper |
| 4,317,889 A | 3/1982 | Pcolinsky, Jr. |
| 4,347,285 A | 8/1982 | Batdorf |
| 4,349,494 A | 9/1982 | Fulmer |
| 4,385,171 A | 5/1983 | Schnabel et al. |
| 4,425,465 A | 1/1984 | Padget et al. |
| 4,476,276 A | 10/1984 | Gasper |
| 4,516,879 A | 5/1985 | Berry et al. |
| 4,558,090 A | 12/1985 | Drexler et al. |
| 4,567,228 A | 1/1986 | Gaa et al. |
| 4,572,862 A | 2/1986 | Ellis |
| 4,587,323 A | 5/1986 | Toman |
| 4,607,066 A | 8/1986 | Barry et al. |
| 4,654,375 A | 3/1987 | Malwitz |
| 4,683,279 A | 7/1987 | Milligan et al. |
| 4,750,963 A | 6/1988 | Kunishige et al. |
| 4,795,590 A | 1/1989 | Kent et al. |
| 4,851,044 A | 7/1989 | Stawinski |
| 4,871,477 A | 10/1989 | Dimanshteyn |
| 4,876,302 A | 10/1989 | Noll et al. |
| 4,877,829 A | 10/1989 | Vu et al. |
| 4,992,481 A | 2/1991 | Von Bonin et al. |
| 5,051,152 A | 9/1991 | Siuta et al. |
| 5,066,733 A | 11/1991 | Martz et al. |
| 5,124,426 A | 6/1992 | Primeaux, II et al. |
| 5,143,987 A | 9/1992 | Hansel et al. |
| 5,143,995 A | 9/1992 | Meckel et al. |
| 5,148,645 A | 9/1992 | Lehnert et al. |
| 5,151,454 A | 9/1992 | Goto et al. |
| 5,173,538 A | 12/1992 | Gilch et al. |
| 5,202,001 A | 4/1993 | Starner et al. |

(Continued)

FOREIGN PATENT DOCUMENTS

CA   1243215   10/1988

(Continued)

OTHER PUBLICATIONS

"Advances in Urethane Science and Technology", Waterborne Polyurethanes; Rosthauser, James W.; Nachtkamp, Klaus; 1989, vol. 10, pp. 121-162, Mobay Corp., Pittsburgh, PA.

(Continued)

Primary Examiner—Ana Woodward
(74) Attorney, Agent, or Firm—Michael E. Wheeler; Lucy C. Weiss

(57) ABSTRACT

A liner is the product of reaction of (a) a hydrophilic prepolymer bearing isocyanate groups; and (b) a waterborne polymer dispersion, the polymer bearing groups that are reactive to isocyanate groups; wherein the dispersion has a sufficiently high solids content, and the polymer has a sufficiently high modulus and glass transition or crystalline melting temperature, that the product of reaction exhibits a 24-hour Tensile Strength of at least about 2.5 MPa.

49 Claims, No Drawings

U.S. PATENT DOCUMENTS

| | | |
|---|---|---|
| 5,306,764 A | 4/1994 | Chen |
| 5,312,865 A | 5/1994 | Hoefer et al. |
| 5,314,942 A | 5/1994 | Coogan et al. |
| 5,321,077 A | 6/1994 | Hayes et al. |
| 5,341,799 A | 8/1994 | Fifield et al. |
| 5,407,968 A | 4/1995 | Sano |
| 5,502,001 A | 3/1996 | Okamoto |
| 5,554,686 A | 9/1996 | Frisch, Jr. et al. |
| 5,555,686 A | 9/1996 | Bird et al. |
| 5,578,693 A | 11/1996 | Hagstrom et al. |
| 5,616,677 A | 4/1997 | Primeaux, II et al. |
| 5,696,291 A | 12/1997 | Bechara et al. |
| 5,698,656 A | 12/1997 | Ohashi et al. |
| 5,708,073 A | 1/1998 | Dodge et al. |
| 5,716,711 A | 2/1998 | Calder et al. |
| 5,723,534 A | 3/1998 | Murray |
| 5,747,628 A | 5/1998 | Schmalstieg et al. |
| 5,798,409 A | 8/1998 | Ho |
| 5,814,398 A | 9/1998 | Kronz et al. |
| 5,840,782 A | 11/1998 | Limerkens et al. |
| 5,880,167 A | 3/1999 | Krebs et al. |
| 5,925,781 A | 7/1999 | Pantone et al. |
| 6,017,998 A | 1/2000 | Duan et al. |
| 6,080,488 A | 6/2000 | Hostettler et al. |
| 6,121,354 A | 9/2000 | Chronister |
| 6,166,127 A | 12/2000 | Tomko |
| 6,310,114 B1 | 10/2001 | Genz et al. |
| 6,316,543 B1 | 11/2001 | Fiori |
| 6,503,997 B1 | 1/2003 | Saito et al. |
| 6,528,073 B1 | 3/2003 | Roulier et al. |
| 6,569,944 B1 | 5/2003 | Weikard et al. |
| 6,590,028 B1 | 7/2003 | Probst et al. |
| 6,596,819 B1 | 7/2003 | Morikawa et al. |
| 6,660,376 B1 | 12/2003 | Zimmel et al. |
| 2001/0003031 A1 | 6/2001 | Tamura et al. |
| 2002/0007036 A1 | 1/2002 | Bruchmann et al. |
| 2002/0161159 A1 | 10/2002 | Vedula |
| 2003/0022960 A1 | 1/2003 | Macpherson |
| 2003/0176596 A1 | 9/2003 | Kenig-Dodiuk |
| 2003/0187136 A1 | 10/2003 | Maier et al. |
| 2004/0072941 A1 | 4/2004 | Nickolaus et al. |

FOREIGN PATENT DOCUMENTS

| | | | |
|---|---|---|---|
| CA | 2107496 | | 4/1995 |
| DE | 3343212 A1 | | 6/1985 |
| DE | 44 47 550 | | 3/1996 |
| EP | 0 294 704 | | 12/1988 |
| EP | 0 287 736 | | 11/1993 |
| EP | 0 459 257 | | 4/1995 |
| EP | 1 283 228 | | 2/2003 |
| FR | 2526014 | | 5/1982 |
| GB | 885762 | | 12/1961 |
| JP | 55039568 | | 3/1980 |
| JP | 57-104798 | | 6/1982 |
| JP | 61-57622 | * | 3/1986 |
| JP | 61-57655 | * | 3/1986 |
| JP | 61225375 | | 10/1986 |
| JP | 62052155 | | 3/1987 |
| JP | 3041173 | | 2/1991 |
| JP | 6032857 | | 2/1994 |
| WO | WO 02/0649692 | | 8/2002 |
| WO | WO 02/079334 | | 10/2002 |
| WO | WO 03/054093 | | 7/2003 |
| WO | WO 03/106528 | | 12/2003 |

OTHER PUBLICATIONS

Encyclopedia of Chemical Technology by Kirk and Othmer, 2nd Ed., vol. 12, pp. 46, 47, Interscience Pub. (1967).

Chemical Abstracts, vol. 106, No. 10, Mar. 1987, Abstract No. 72051X, p. 321.

Mining Health and Safety Conference 2001, "Assessing Acceptance Criteria for and Capabilities of Liners for Mitigating Ground Falls" Archibald, Apr. 18, 2001.

Coatings Magazine, "Plastic Coating for Mines Innovative Form of Rock Support", p. 19, Sep./Oct. 1992.

* cited by examiner

SPRAYABLE MINING LINER

STATEMENT OF PRIORITY

This application is a continuation-in-part of application Ser. No. 09/952,150 filed Sep. 11, 2001 now abandoned, and claims the priority thereof.

FIELD OF THE INVENTION

The invention relates to an elastomeric polymeric film that can be used as a load-bearable coating, for example, to assist in protecting from rock bursts in a mine. The invention also relates to a method for providing support to surfaces such as, for example, rock surfaces.

BACKGROUND OF THE INVENTION

Underground mining requires support of the roof and walls of the mine to prevent injury due to rock bursts. Several materials have been used for this purpose, including shotcrete, wire mesh, and sprayable liner compositions. Both shotcrete and wire mesh are somewhat difficult to handle and apply in the underground mines, more particularly in deep mining applications. The application of shotcrete/gunite is labor intensive, and the linings are generally brittle, lacking in significant tensile strength and toughness, and prone to fracturing upon flexing of the rock during mine blasting. In addition, shotcrete/gunite generally develops its desired strength of about 1 MPa only slowly. The sprayable liners that develop strength quickly are often toxic during spray application, whereas liners that have low toxicity during spray application are often not tough enough and generally require more than four hours (at ambient temperature without application of heat) to develop the minimum strength desired to be useful in the mining environment.

SUMMARY OF THE INVENTION

Thus, we recognize that a tough, flexible, easy-to-apply, quick strength-developable (at ambient temperature) liner system is needed. The present invention provides such a liner, which is the product of reaction of:

(a) a hydrophilic prepolymer bearing isocyanate groups; and
(b) a water-borne polymer dispersion, the polymer bearing groups that are reactive to isocyanate groups;

wherein the dispersion has a sufficiently high solids content, and the polymer has a sufficiently high modulus and glass transition or crystalline melting temperature, that the product of reaction exhibits a 24-hour Tensile Strength of at least about 2.5 MPa.

Preferably, the polymer dispersion is a polyurethane dispersion.

As used herein, the term "liner" means a load-bearable coating that can be applied to a surface (for example, the surfaces of mining cavities, highway overpasses and underpasses, and roadsides, for example, to provide support and/or to contain loose or falling debris); the term "modulus" means tensile modulus and/or storage modulus; and the terms "24-hour Tensile Strength" and "4-hour Tensile Strength" mean a tensile strength value that is measured 24 hours and 4 hours, respectively, after mixing components (a) and (b) according to ASTM D-638-97 (Standard Test Method for Tensile Properties of Plastics, published by American Society for Testing and Methods, West Conshohocken, Pa.) modified by utilizing a crosshead speed of 200 mm per minute, a sample width of 0.635 cm (0.25 inch), and a gauge separation of 3.81 cm (1.5 inches).

The liner of the invention, in spite of its hydrogel nature, exhibits surprising ultimate load-bearing capability (upon complete cure) and, prior to complete cure, generally develops sufficient strength to be useful in a load-bearing capacity (for example in a mining environment) within 24 hours and, often, within about 4 hours. The starting liner components can be easily applied to a surface by spraying, yet cure to provide a tough, flexible coating.

In another aspect, the invention provides a method for providing a surface with a liner, the method comprising
(a) applying to the surface
  (1) a hydrophilic prepolymer bearing isocyanate groups, and
  (2) a water-borne polymer dispersion, the polymer bearing groups that are reactive to isocyanate groups; and
(b) allowing the applied components (1) and (2) to react to form the liner;
  wherein the dispersion has a sufficiently high solids content, and the polymer has a sufficiently high modulus and glass transition or crystalline melting temperature, that the liner exhibits a 24-hour Tensile Strength of at least about 2.5 MPa.

In yet another aspect, this invention also provides a kit for producing a liner, the kit comprising
(a) a hydrophilic prepolymer bearing isocyanate groups; and
(b) a water-borne polymer dispersion which when combined with component (a) reacts to form a liner, the polymer bearing groups that are reactive to the isocyanate groups;
  wherein the dispersion has a sufficiently high solids content, and the polymer has a sufficiently high modulus and glass transition or crystalline melting temperature, that the liner exhibits a 24-hour Tensile Strength of at least about 2.5 MPa.

DETAILED DESCRIPTION OF THE INVENTION

Preferred polymer dispersions for use as component (b) or (2) are those that comprise polymers that are sufficiently stiff that a film prepared from the polymer (for example, by casting the polymer dispersion) has a tensile modulus (measured according to ASTM D-638-97 (Standard Test Method for Tensile Properties of Plastics, published by American Society for Testing and Methods, West Conshohocken, Pa.) modified by utilizing a crosshead speed of 245 mm per minute, a gauge separation of 51 mm, and a sample thickness of 0.05 mm) of at least about 6.89 MPa at 100% elongation (more preferably at least about 13.79 MPa at 100% elongation and most preferably at least about 20.69 MPa at 100% elongation) or a storage modulus of at least about $5 \times 10^8$ dynes/cm$^2$ (more preferably, at least about $1 \times 10^9$ dynes/cm$^2$) measured using a dynamic mechanical analyzer (DMA; for example, a Rheometrics™ RDA-2) at a sample thickness of 1.5 mm and a frequency of 1 hertz in an 8-mm parallel plate at room temperature. More preferably, both the tensile modulus and the storage modulus of the polymer fall within the respective preferred ranges. Preferred polymers have a glass transition temperature or crystalline melting temperature (value of $T_g$ or $T_m$) greater than about 30° C., more preferably greater than about 40° C., most preferably greater than about 50° C.

Other preferred features of the polymer include (i) that it has a molecular weight ($M_w$ in g/mol as measured by gel permeation chromatography (GPC) versus polystyrene standards) in the range of at least about 50,000, more preferably from about 100,000 to about 700,000; (ii) that it is in the form of particles of an average size from about 10 to about 10,000 nm, more preferably from about 30 to about 1000 nm, most preferably from about 30 to about 500 nm; and (iii) that the polymer is used as a dispersion in water containing essentially no organic solvent (for example, N-methyl pyrrolidone). Surprisingly, dispersions of even high modulus, high $T_g$ or $T_m$ polymers can be used to obtain films (upon reaction with component (a)) without the need for co-solvent (or added heat).

The groups on the polymer that are reactive to isocyanate groups are preferably hydroxyl (alcohol), primary or secondary amino, or carboxylic acid groups, more preferably amino groups, most preferably primary amino groups. Preferably, the polymer has an average reactive group functionality of at least about one, more preferably at least about 2.

Polymer dispersions that can be used as component (b) include polyurethane dispersions, poly(styrene-acrylic) dispersions, and the like. Especially preferred are the polymer dispersions commonly represented in the art by the term "polyurethane dispersions," which is generally recognized (and used herein) to encompass such polymer dispersions as polyurea dispersions, polyurethane dispersions, polythiocarbamate dispersions, and dispersions of combinations thereof (for example, dispersions such as poly(urethane-urea) dispersions), as well as dispersions of polyurethane-polyvinyl hybrids (preferably "copolymers" comprising semi-interpenetrating polymer networks) including, for example, polyurethane-polyacrylic dispersions. The typical waterborne polyurethane dispersion is often a poly(urethane-urea) dispersion due to reaction of some isocyanate with water, followed by decarboxylation as described above, or due to chain extension by diamines. Most preferred are polyurethane-polyacrylic dispersions.

Water-borne polymers and processes for their preparation are known, and many are commercially available. Examples of water-borne polyurethanes and such processes are described in "Advances in Urethane Science and Technology", Waterborne Polyurethanes; Rosthauser, James W.; Nachtkamp, Klaus; 1989, Vol. 10, pp. 121–162, Mobay Corp., Pittsburgh, Pa., the description of which is incorporated herein by reference. The water-borne polyurethane dispersion can be made, for example, according to one of the methods described in this reference. Other suitable examples of water-borne polyurethane dispersions and processes for their preparation are described in U.S. Pat. No. 5,312,865; U.S. Pat. No. 5,555,686; U.S. Pat. No. 5,696,291; U.S. Pat. No. 10 4,876,302, and U.S. Pat. No. 4,567,228. The disclosures of these patents are incorporated herein by reference. A preferred method for forming the water-borne polyurethane dispersion is the prepolymer method. Dispersions of polymers other than polyurethanes and processes for their preparation are described, for example, in Encyclopedia of Polymer Science and Engineering, Volume 6, pages 1–48, Wiley-Interscience, New York (1986), the description of which is incorporated herein by reference.

The water-borne polymer is preferably hydrophobic in nature to reduce or prevent hydrolysis of its polymeric backbone. The hydrolytic resistance of the polymer can depend on the backbone of the precursor (for example, in the case of a polyurethane, the polyol) that is used in its synthesis. Useful precursor polyols include, for example, polyether polyols, polyester polyols, polycarbonate polyols, and the like. Normally adipic acid-based polyester polyols are more resistant to hydrolysis than phthalate-based polyester polyols. The polyurethane dispersions made from prepolymers having polyols based on polycarbonate or dimer acid diol generally have higher hydrolytic resistance than polyester-based polyols.

Suitable non-urethane water-borne dispersions include Acronal™ 305D, a water-based styrene-acrylic emulsion (total solids 50%) available from BASF, USA. Suitable water-borne polyurethanes include, for example, NeoPac™ 9699, a water-borne urethane/acrylic based polyurethane (total solids 40%; viscosity 100 cps at 25° C.; elongation 160%; 100% modulus 26.2 MPa) from Neoresins, Ontario, Canada; Hauthane™HD 2334, a polyether water-borne urethane dispersion (solids 45%; elongation 200%; 100% modulus 17.24 MPa) from C. L. Hauthaway & Sons Corporation, Mass., USA; Hybridur™ 580, a polyester-acrylic based urethane dispersion from Air Products, USA; and Hybridur 580, an acrylic-urethane dispersion, from Air Products & Chemicals Inc., Pa., USA.

The amount of water present in these commercially available dispersions ranges from about 35% or 50% to about 65% or 70% by weight. This range is normally satisfactory for use in the invention. Use of amounts of water outside of this range are, however, within the scope of this invention, and the percentage of water can be readily adjusted. Generally, water-borne polymer dispersions useful as component (b) or (2) will have a solids content (content of solid polymer) of at least about 30 percent by weight (preferably, at least about 35 percent by weight; more preferably, at least about 40 percent by weight; most preferably, at least about 50 percent by weight) based upon the total weight of the dispersion. Preferably, the dispersion contains no more than about 80 percent (more preferably, no more than about 70 percent; most preferably, no more than about 60 percent) water by weight, based upon the total weight of the dispersion.

Other water-borne polymeric emulsions (such as emulsions of various acrylic, styrene butadiene, or vinyl acetate polymers) that form a continuous liner film of lower tensile strength (than the values described above for component (b) or (2) polymers) can replace part of the water-borne polymer dispersion. Examples include Rhoplex™ 2848 and Rhoplex™ 2438 (acrylic emulsions from Rohm & Haas Company). However, these emulsions generally reduce the initial (4 hrs) and ultimate tensile strengths and generally cannot provide the desired preferred strength of the resulting liner of at least about 1 MPa tensile strength within about 4 hours at room temperature, preferably within about two hours.

Hydrophilic isocyanate group-bearing prepolymers suitable for use in the liner, kit, and method of the invention are those that are capable of reacting with component (b) (or (2)) to form a crosslinked hydrogel. One class of useful prepolymers is that represented by the formula:

wherein R is an active hydrogen-free residue of a polyol (preferably, a polyether polyol, for example, ethylene glycol, glycerol, or 1,1,1-trimethylolpropane); (R'O)$_a$ is a hydrophilic poly(oxyalkylene) chain having a plurality of randomly distributed oxyethylene and higher oxyalkylene units; the subscript "a" (the number of oxyalkylene units in the poly(oxyalkylene) chain, this number being sufficient to impart water-solubility and preferably noncrystallinity to the prepolymer) has a value between about 50 and about 500; R" is a residue or nucleus of a polyisocyanate precursor (preferably an aromatic nucleus, for example, toluene); "b" is an integer, generally 1–5, where (b+1) is the number of isocyanate moieties present in the polyisocyanate precursor; the subscript "c" is a number equal to the functionality or number of active hydrogen atoms in the polyol, and generally "c" will be 2–6. The moiety —C(O)NH— together with the adjacent oxygen atom of the poly(oxyalkylene) chain is a carbamate (or urethane) group resulting from the reaction of a hydroxy group of the polyol precursor with an isocyanate moiety from the polyisocyanate precursor. The terminating isocyanate groups can react with water, resulting in the formation of a gelled mass.

Preferred hydrophilic prepolymers are those of the formula:

R[(CH$_2$CH$_2$O)$_d$(CH(CH$_3$)CH$_2$O)$_e$(CH$_2$CH$_2$O)$_f$—C(=O)NH—R"—NCO]$_c$ where R, R", and "c" are as defined above, and "d", "e" and "f" are integers such that the ratio of (d+f):e is 2:1 to 4:1.

The hydrophilic prepolymer is preferably a urethane-containing polymer bearing isocyanate groups and can be formed by reacting a hydrophilic polyol with an excess of monomeric polyisocyanate. This step can be followed by purifying the hydrophilic prepolymer of unreacted monomeric polyisocyanate or, preferably, by quenching the unreacted monomeric polyisocyanate with a compound that is reactive to isocyanate groups, so that the prepolymer preferably contains less than about 0.7 weight percent (more preferably, less than about 0.5 weight percent) of unreacted monomeric polyisocyanate.

Unless the amount of unreacted monomeric polyisocyanate present in the mixture containing the hydrophilic prepolymer is lowered through a purification step or effectively reduced by, for example, quenching the isocyanate groups of the monomeric polyisocyanate, the presence of the monomeric polyisocyanate can result in toxicity (for example, during spraying). It was surprisingly found that by removing or quenching the unreacted monomeric polyisocyanates according to a preferred process of the present specification, preferred liners of superior strength were produced. Other advantages include reduced toxicity, and lowered heat generation.

The hydrophilic prepolymer can be purified from unreacted monomeric polyisocyanate by processes and/or methods using, for example, falling film evaporators, wiped film evaporators, distillation techniques, various solvents, molecular sieves, or organic reactive reagent such as benzyl alcohol. U.S. Pat. No. 4,061,662 removes unreacted tolylene diisocyanate (TDI) from an isocyanate prepolymer by contacting the prepolymer with molecular sieves. U.S. Pat. Nos. 3,248,372, 3,384,624, and 3,883,577 describe processes related to removing free isocyanate monomers from prepolymers by solvent extraction techniques. It is also possible to distill an isocyanate prepolymer to remove the unreacted diisocyanate according to U.S. Pat. No. 4,385,171. It is necessary to use a compound that is only partially miscible with the prepolymer and has a higher boiling point than that of the diisocyanate to be removed. U.S. Pat. Nos. 3,183,112, 4,683,279, 5,051,152 and 5,202,001 describe falling film and/or wiped film evaporation. According to U.S. Pat. No. 5,502,001, the residual TDI content can be reduced to less than 0.1 wt. % by passing the prepolymer at ~100° C. through a wiped film evaporator, while adding an inert gas, especially nitrogen, to the distillation process to sweep out the TDI. The method descriptions of all of these references are incorporated herein by reference.

In a preferred purification method, unreacted preferably monomeric polyisocyanates can be quenched with an amine (preferably a secondary amine, more preferably a monofunctional secondary amine) or an alcohol (for example, an arylalkyl alcohol), preferably in the presence of a tertiary amine catalyst (such as, triethylamine) or an alkoxysilane bearing a functional group that is reactive to isocyanate groups (for example, an amine). The unreacted polyisocyanates are more preferably reacted with an arylalkyl alcohol, such as benzyl alcohol, used with a tertiary amine. The unreacted polyisocyanates are most preferably reacted with an arylalkyl alcohol, such as benzyl alcohol, used in conjunction with an alkoxysilane bearing one secondary amino group. The unreacted polyisocyanates can be quenched without substantially affecting the terminal isocyanate groups of the hydrophilic prepolymer.

Examples of suitable amines include N-alkyl aniline (for example, N-methyl or N-ethyl aniline and its derivatives), diisopropylamine, dicyclohexylamine, dibenzylamine, and diethylhexylamine.

Example of suitable alcohols include arylalkyl alcohols (for example, benzyl alcohol and alkyl-substituted derivatives thereof).

Examples of suitable silanes include Dynasylan™ 1189 (N-(n-butyl)-aminopropyltrimethoxysilane available from Degussa Corporation, N.J., USA), Dynasylan™ 1110 (N-methyl-3-aminopropyltrimethoxysilane available from Degussa Corporation, N.J., USA), Silquest™ A-1170 (bis(trimethoxysilylpropyl)amine available from Osi Specialties, Crompton Corporation, USA), and Silquest™ Y-9669 (N-phenyl)-gamma-aminopropyltrimethoxysilane available from Osi Specialties, Crompton Corporation, USA).

When alcohols are used to quench the unreacted polyisocyanates, the application of heat is often required to reduce the reaction time. Reactions with amines can generally be conducted, however, at ambient temperature for a relatively shorter period of time.

The amount of unreacted monomeric polyisocyanate present in the reaction mixture comprising the hydrophilic prepolymer following the reaction with the amine, alcohol, or silane is most preferably 0, but preferably can range up to about 0.7 weight percent, more preferably up to about 0.5 weight percent.

A preferred method of purifying the hydrophilic prepolymer (a) is by the method of U.S. patent application Ser. No. 09/952,118, filed on even date herewith, the disclosure of which is incorporated herein by reference.

A suitable, relatively low-cost hydrophilic polyol for use in the preparation of the hydrophilic prepolymer bearing isocyanate groups is a polyether polyol having at least two, preferably three, hydroxyl groups, and a number average molecular weight in the range of from about 2,000 to about 20,000, preferably about 2,000 to about 5,000, most preferably about 4,000 to about 5,000, and having random ethylene oxide units and higher alkylene oxide units in a mol ratio of ethylene oxide (EO) to higher alkylene oxide of 1:1 to 4:1. The higher alkylene oxide can be selected from the group consisting of propylene oxide (PO), butylene oxide, pentylene oxide, hexylene oxide and mixtures thereof. The hydrophilic polyol is preferably a polyoxyethylene-propylene polyol comprising, for example, 50 to 70% EO and 30 to 50% PO. A particularly preferred polyether triol is one comprising approximately 68% EO and approximately 32% PO. Alternate ratios of EO:PO can be used in preparing the hydrophilic polyol of the present invention provided that the hydrophilicity of the resulting polyol is not significantly adversely affected. These ratios can be determined by routine testing.

Commercially available polyol precursors useful in making the above described water-soluble isocyanate-terminated prepolymers are hydrophilic polyether polyols, for example, a polyG™ triol, such as "polyG™ -83-84" (30% ethylene oxide and 70% propylene oxide), available from Arch Chemicals. The degree of overall hydrophilicity of the prepolymeric mixtures can be modified by varying the ratio of ethylene oxide to propylene oxide in the hydrophilic polyol, or by using small amounts of poly(oxyethylene -oxypropylene) polyols sold under the trademark "Pluronic", such as Pluronic-L35, F38, and P46, or hydrophilic polyols with heteric oxyethylene-oxypropylene chain sold by Huntsman Performance Chemicals, Utah, USA, as Polyol Functional Fluids, such as WL-580, WL-600, and WL-1400.

The hydrophilic prepolymer bearing isocyanate groups can be prepared, for example, by reacting a polyisocyanate with a copolymer of polyoxyethylene-propylene polyol using an NCO/OH equivalent ratio of about 5:1 to about 1.05:1, preferably a ratio of about 2.0:1 to 2.5:1. The preparation of isocyanate-terminated prepolymers is disclosed in, for instance, U.S. Pat. Nos. 4,315,703 and 4,476,276 and in references mentioned in those patents. The disclosures of these patents are incorporated herein by reference. Preferably, aromatic isocyanate is used for its greater reactivity rate than aliphatic isocyanate. Benzoyl chloride can be added during prepolymer preparation to avoid side reactions of polyisocyanate.

Polyisocyanates that can be used to prepare the hydrophilic prepolymer having isocyanate groups include aliphatic and aromatic polyisocyanates. The preferred polyisocyanates are aromatic polyisocyanates. One of the most useful polyisocyanate compounds that can be used is tolylene diisocyanate, particularly as a blend of 80 weight percent of tolylene-2,4-isocyanate and 20 weight percent of tolylene-2,6-isocyanate; a 65:35 blend of the 2,4- and 2,6-isomers is also useable. These polyisocyanates are commercially available under the trademark "Hylene", as Nacconate™ 80, and as Mondur™ RD-80. The tolylene isocyanates can also be used as a mixture with methylene diisocyanate. Other polyisocyanate compounds that can be used include other isomers of tolylene diisocyanate, hexamethylene-1,6-diisocyanate, diphenyl-methane-4,4'-diisocyanate, m- or p-phenylene diisocyanate, and 1,5-naphthalene diisocyanate.

Polymeric polyisocyanates can also be used, such as polymethylene polyphenyl polyisocyanates, such as those sold under the trademarks "Mondur" MRS, and "PAPI". A list of useful commercially available polyisocyanates is found in *Encyclopedia of Chemical Technology* by Kirk and Othmer, 2nd Ed., Vol. 12, pages 46–47, Interscience Pub. (1967).

Preferably, no solvent is used to dilute the hydrophilic prepolymer. However, a solvent can be used if necessary. Solvents that can be used to dissolve the prepolymer are water-miscible, polar organic solvents that are preferably volatile at the ambient conditions of the environment where the composition is to be used. The solvent chosen should be such that the resulting solution of prepolymers and solvent will not freeze at the ambient conditions present in the environment where the mixed composition of the invention is to be applied. For example, where the ambient temperature is about 50° F., a solution of about 60–90 (or higher) weight percent of prepolymer solids in dry acetone is an effective composition. Other useful water-miscible solvents include methyl acetate, tetrahydrofuran, monoethyl ether acetate (sold under the trade designation "Cellosolve" acetate), diethyl acetal, and hydrophilic plasticizers, such as Atpol™ 1120 polyether, available from Uniquema, Belgium.

The product of the reaction of hydrophilic prepolymer and the polymer dispersion is a gelatinous mass, as the hydrophilic moieties of the hydrophilic prepolymer absorb water that is the vehicle of the polymer. This gelatinous mass is sometimes referred to as a gel or hydrogel, and it can be used, for example, as a liner in a mine. Reaction times to convert the prepolymer to the gel can be on the order of less than a minute to several hours.

By utilizing a sufficiently high solids content dispersion comprising polymer having a sufficiently high modulus and glass transition or crystalline melting temperature, the formed gel generally develops a minimum strength of at least about 2.5 MPa within about 24 hours (and, preferably, a minimum strength of at least about 1 MPa within about four hours, more preferably within about 2–4 hours). The solids content of the dispersion and the modulus and glass transition or crystalline melting temperature of the polymer can be varied over a wide range, and the skilled artisan will recognize that a high value for one or two of these parameters can be selected so as to compensate for a low value (for example, a value outside of the preferred ranges described above) of another. The tensile strength of the liner after it is completely formed (fully cured) is preferably at least about 6–12 MPa, more preferably at least about 10–12 MPa, at room temperature. (When "cured," the product of reaction of components (a) and (b) has generally lost most of its water content (for example, more than about 90 percent) and crosslinking is essentially completed.) When the liner-producing components of the present invention are applied at colder temperatures or under high humidity conditions, longer periods of time can be required for the liner to become fully cured. Tensile strength build-up can be accelerated, if desired, by the application of heat during and after application of the components (for example, to accelerate the rate of water evaporation and crosslinking).

When component (b) (or (2)) contains at least about 30% by weight of solid polymer, the weight ratio of component (a) (or (1)) to component (b) (or (2)) is preferably in the range of about 1:3 to about 1:10, more preferably from about 1:4 to about 1:7, and most preferably from about 1:5 to about 1:6, but, when component (b) (or (2)) has a higher solids content than about 50% by weight, the ratio can be 1:1. However, to increase the hydrophobicity of the resulting liner it is desirable and preferred to use as little of component (a) as possible.

Some of the isocyanate groups of the hydrophilic prepolymer can react with water to form carbamic acid moieties which immediately decarboxylate to generate amines. These amines can then react with other isocyanate groups to lead to crosslinking of the prepolymer. Water can be absorbed into the ethylene oxide matrix of the product leading to formation of a gel. The liner of the present invention is preferably gas-tight and flexible. The liner of the invention preferably has an elongation at break of from about 100 to about 1000%, more preferably from about 100 to about 800%, even more preferably from about 100 to about 400%, most preferably from about 100 to about 300%. The resulting liner is, therefore, preferably, a water-insoluble, crosslinked, water-containing gelatinous mass having a high degree of flexibility.

The liners produced according to the invention can be used as load-bearable coatings to support, for example, rock surfaces in a mine. For such applications, the liners are preferably thick, around 0.5 mm to 6 mm, when cured completely and after removal of aqueous solvent.

Other additive ingredients can be included in the liner of the present invention. For example, viscosity modifiers can be included to increase or decrease the viscosity, depending on the desired application technique. Fungicides can be added to prolong the life of the gel and to prevent attack by various fungi. Other active ingredients can be added for various purposes, such as substances to prevent encroachment of plant roots, and the like. Other additives that can be included in the liner of this invention, include, without limitation, rheological additives, fillers, fire retardants, defoamers, and coloring matters. Care should be exercised in choosing fillers and other additives to avoid any materials that will have a deleterious effect on the viscosity, the reaction time, the stability of the liner being prepared, and the mechanical strength of the resulting liner.

The additional filler materials that can be included in the liner of the present invention can provide a more shrink-resistant, substantially incompressible, and fire retardant liner. Any of a number of filler compositions have been found to be particularly effective. Useful fillers include water-insoluble particulate filler material having a particle size of about less than 500 microns, preferably about 1 to 50 microns, and a specific gravity in the range of about 0.1 to 4.0, preferably about 1.0 to 3.0. The filler content of the cured liner of the present invention can be as much as about 10 parts filler per 100 parts by weight cured liner, preferably about 5 parts to about 10 parts per 100.

Examples of useful fillers for this invention include expandable graphite such as Grafguard™ 220–80B or Grafguard™ 160–150B (Graftech, Ohio, USA); silica such as quartz, glass beads, glass bubbles, and glass fibers; silicates such as talc, clays, (montmorillonite) feldspar, mica, calcium silicate, calcium metasilicate, sodium aluminosilicate, and sodium silicate; metal sulfates such as calcium sulfate, barium sulfate, sodium sulfate, aluminum sodium sulfate, and aluminum sulfate; gypsum; vermiculite; wood flour; aluminum trihydrate; carbon black; aluminum oxide; titanium dioxide; cryolite; chiolite; and metal sulfites such as calcium sulfite. Preferred fillers are expandable graphite, feldspar, and quartz. The filler is most preferably expandable graphite. The amount of filler added to the liner of the invention should generally be chosen so that there is no significant effect on elongation or tensile strength of the resulting liner. Such amounts can be determined by routine investigation.

When filler is utilized, the resulting liner can also be fire retardant. For some applications, the liner preferably should meet the fire retardant specifications of CAN/ULC-S102-M88 or ASTM E-84. These tests determine burn rate and the amount of smoke generation.

The starting components (a) (or (1)) and (b) (or (2)) of the liner of the invention are preferably mixed immediately before being applied to a surface. As an example of the mixing process, components (a) and (b) can be pumped using positive displacement pumps and then mixed in a static mixer before being sprayed onto a surface. The mixture of the two components can then be sprayed onto a substrate with or without air pressure. The mixture is preferably sprayed without the use of air. The efficiency of mixing depends on the length of the static mixer. Useful application equipment includes, for example, a pump manufactured by Gusmer Canada, Ontario, Canada, as Model H-20/35, having a 2-part proportioning high pressure spray system that feeds through a heated temperature controlled (for example, 50° C.) zone to an air purging impingement mixing spray head gun of, for example, type GAP (Gusmer Air Purge) also manufactured by Gusmer.

Objects and advantages of this invention are further illustrated by the following examples, but the particular materials and amounts thereof recited in these examples, as well as other conditions and details, should not be construed to unduly limit this invention.

EXAMPLES

Test Methods:

Test method ASTM D-638-97 (Standard Test Method for Tensile Properties of Plastics, published by American Society for Testing and Methods, West Conshohocken, Pa.), modified by utilizing a crosshead speed of 200 mm per minute, a sample width of 0.635 cm (0.25 inch), and a gauge separation of 3.81 cm (1.5 inches), was used for measuring tensile strength and elongation. The tests were performed using an Instron Model 44R1122 tensile tester. Storage modulus was measured using a dynamic mechanical analyzer (a Rheometrics™ RDA-2) at a sample thickness of 1.5 mm and a frequency of 1 hertz in an 8-mm parallel plate at room temperature.

Liners that were made in accordance with the present invention have passed the Dynamic Stress Membrane Materials testing. Small-scale tests confirmed that the lining material met the basic requirements set by both the liner manufacturer and members of the mining industry. For small scale testing, the liner material was applied by hand mixing components (a) and (b) of the liner composition to the surface of granite core samples (2 inches (5.1 cm) in diameter and 4 inches (10.2 cm) long) leaving a 6 mm gap at each end.

A leading mining company supplied the granite cylinders. A crush test was carried out at Golder Associates, in London, Ontario, after the samples were left for 4 hours and 24 hours at room temperature. Force was applied on the cylinders by a compressive load using a soft, uncontrolled testing machine to maximize the potential energy available to sustain a violent type of failure of the cylinders. The granite cylinders were failed without damaging the applied liner on the cylinders.

Large granite cylinders (7.5 inch (about 19 cm) in diameter and 19 inch (about 48 cm) long) were sprayed using a pump system and mixed in a static mixer with two different liner compositions using three different thicknesses. These tests were carried out in Sudbury, Ontario in CANMET Lab. Again, the cylinders were crushed without affecting the applied liners.

Prepolymer 1:

A general description of prepolymer preparations that can be used to prepare prepolymer A is given in U.S. Pat. No. 4,476,276, the disclosure of which is incorporated by reference, especially the preparation of prepolymers A, B and C of U.S. Pat. No. 4,476,276.

An amount of benzoyl chloride 0.04% (based on the total amount of polyol and tolylene diisocyanate (TDI)) was blended at room temperature under an inert atmosphere with 1 equivalent of polyether triol (a copolymer of ethylene oxide and propylene oxide sold under the trade designation polyG-83-34, mol. wt. 5400, available from Arch Chemicals), thereafter, 2.4 equivalents of an 80:20 mixture of 2,4 tolylene diisocyanate: 2,6 tolylene diisocyanate (Mondur™ TD-80 available from Bayer Corporation, USA) was added to the resultant mixture with agitation, producing a moderate exotherm that was maintained at 80–85° C. until the reaction was completed. The solution of the prepolymer was then cooled to room temperature. The solution contained prepolymers having on average 3.0 to 3.2 weight percent isocyanate groups, and 1.2–2.4 weight percent monomeric TDI, as determined by nuclear magnetic resonance (NMR) techniques.

Prepolymer 2:

In a 3-necked 2 L round bottom flask, equipped with a mechanical stirrer and a thermometer, 1271.3 g of Prepolymer 1 was added under an argon atmosphere, 98.1 g (30 molar percent with respect to the total NCO groups in Prepolymer 1) of Silquest™ A-1170 bis (trimethoxysilylpropyl)amine (available from Osi Co.) was added dropwise to the prepolymer at 25° C. under argon and with stirring (250 rpm). The reaction was exothermic causing a 0–10° C. increase in temperature. The reaction mixture was collected after 2 h. The monomeric TDI content was found to be below 0.5 weight percent, as determined by NMR.

Prepolymer 3:

In a 3-necked 250 ml round bottom flask, equipped with a mechanical stirrer and a thermometer, 205.9 g of Prepolymer 1 were added under argon. 7.52 g (40 molar percent with respect to the total NCO groups in Prepolymer 1) of N-ethyl aniline was then added to the prepolymer while stirring at 25° C. The mixture was collected after 2 h. The monomeric TDI content was found to be below 0.2 weight percent, as determined by NMR.

Prepolymer 4:

In a 3-neck round bottom flask, equipped with a mechanical stirrer and a thermometer, 200 g of Prepolymer 1 was added under argon. 2.74 g (15 molar percent with respect to the total NCO groups in Prepolymer 1) of N-ethyl aniline was added dropwise to the prepolymer at 25° C. under argon and with stirring (250 rpm). The reaction was kept at room temperature for 2 h. Then 7.52 g (15 molar percent with respect to the total NCO groups in the Prepolymer #1) Silquest™A-1170 bis (trimethoxysilylpropyl)amine was added to the mixture under argon and with stirring. The reaction was kept at room temperature for 2 h before collection. The monomeric TDI content was found to be below 0.3 weight percent, as determined by NMR.

Prepolymer 5:

In a 3-neck 250 ml round bottom flask, equipped with a mechanical stirrer and a thermometer, 201.0 g of Prepolymer 1 was added under argon. 2.45 g (15 molar percent with respect to the total NCO groups in Prepolymer 1) of benzyl alcohol was added to the prepolymer under argon. The temperature was then raised to 85° C. and the reaction was carried out for 2 h. After the reaction mixture was cooled to room temperature, 7.52 g (15 molar percent with respect to the total NCO groups in Prepolymer 1) Silquest™ A-1170 bis (trimethoxysilylpropyl)amine was added to the mixture under argon and with stirring. The reaction was kept at room temperature for 2 h before collection. The monomeric TDI content was found to be below 0.2 weight percent, as determined by NMR.

Prepolymer 6:

In a 3-necked 2 L round bottom flask, equipped with a mechanical stirrer and a thermometer, 1280.0 g of Prepolymer 1 and 320.0 g of dry acetone were added under argon atmosphere. 134.8 g (40 molar percent with respect to the total NCO groups in the prepolymer of Example 1) of Silquest™ A-1170 bis (trimethoxysilylpropyl)amine was added dropwise to the solution at 25° C. under argon and with stirring (900 rpm). The reaction mixture was collected after 2 h. The monomeric TDI content was found to be below 0.1 weight percent, as determined by NMR.

Prepolymer 7:

In a 3-necked 500 ml round bottom flask, equipped with a mechanical stirrer and a thermometer, 374.9 g of Prepolymer 1 was added under an argon atmosphere. 17.36 g (17 molar percent with respect to the total NCO groups in Prepolymer 1) of Silquest™ A-1170 bis(trimethoxysilylpropyl)amine (available from Osi Co.) was added dropwise to the prepolymer at 25° C. under argon and with stirring (250 rpm). The reaction was exothermic, causing a 0–10° C. increase in temperature. The resulting mixture was allowed to react for 1 hour at ambient temperature and then heated at 45° C. for 2 hours. The reaction mixture was collected after that period. The monomeric TDI content was found to be below 0.7 weight percent, as determined by NMR.

TABLE A

Component (b) Polymer Characteristics

| Polymer Dispersion (Component (b)) | Percent Solids | Percent N-Methyl Pyrrolidone (NMP) | Glass Transition or Crystalline Melting Temperature (° C.)+ | Tensile Modulus at 100% Elongation (MPa) | Storage Modulus (dynes/cm$^2$) | Isocyanate-Reactive Groups |
|---|---|---|---|---|---|---|
| Vancryl ™ 937 | 46 | 0 | 24 | — | — | no |
| Luphen ™ 3528 | 40 | 7 | <35 | 7.5* | — | no |
| Acronal ™ 305D | 50 | 0 | 36 | — | 5 × 10$^9$ | yes |
| Hybridur ™ -580 | 40 | 7 | 80 | — | 3 × 10$^9$ | yes |
| Hauthane ™ HD-2334 | 45 | 0 | — | 17** | — | yes |
| NeoPac ™ R-9699 | 40 | 0 | >80 | 26** | 3 × 10$^9$ | yes |

+measured using a dynamic mechanical analyzer (DMA) except for the value for Vancryl ™ 937, which was supplied by the manufacturer
*measured at a cross head speed of 200 mm/min, cross sectional area of sample 0.17 mm$^2$, and gauge 20 mm
**measured as described on page 3 above
—data not available

Examples 1–5

Examples 1–5 provide data for liners formed using NeoPac™ 9699 polyurethane dispersion and different prepolymers. The samples were made by quickly injecting 4.0 g of a prepolymer to 20 g of NeoPac™ 9699 (40%) solid polyurethane dispersion (from NeoResin Canada) followed by mixing the two components with a spatula and spreading the mixture on a polyester film to a thickness of about 2 to 3 mm. The film surface was not smooth due to rapid gelling of the two components. The value of tensile strength of these samples, and the components used to produce them are provided in Table 1. The results indicate that prepolymers with a low amount of monomeric diisocyanate (except for Example 3, which is quenched with 40 molar percent mono-functional amine) can provide the same or better tensile strength as compared to Example 1, a liner formed by unmodified prepolymer and polyurethane dispersion. Although Example 3 does not demonstrate a tensile strength of 1 MPa after 4 hours, it does demonstrate good results after three days.

TABLE 1

| Example No. | Prepolymer No. | Tensile properties at 4 h | | Tensile properties at 3 days | |
| --- | --- | --- | --- | --- | --- |
| | | Strength (MPa) | Elongation (%) | Strength (MPa) | Elongation (%) |
| 1 | 1 | 1.3 | 305 | 9.1 | 550 |
| 2 | 2 | 1.2* | 840* | 10.2 | 330 |
| 3 | 3 | 0.9 | 800 | 10.2 | 330 |
| 4 | 4 | 1.6 | 630 | 9.2 | 350 |
| 5 | 5 | 1.7 | 660 | 8.9 | 380 |

*Value at 3 hr.

Comparative Examples 1 and 2 and Examples 6–8

The samples of the following examples and comparative examples were made by injecting 4.5 g of prepolymer quickly to 20 g of each dispersion along with 2 g of fused silica, mixing with a spatula and spreading on a polyester film to a thickness of 1.9 mm to 3 mm. The films were not very smooth due to rapid gelling of the two components. The values of tensile strength of these samples, and the components used to produce them are provided in Table 2.

TABLE 2

| Example No. | Components of Composition | Amount (g) | Tensile Strength (MPa) After 4 hours |
| --- | --- | --- | --- |
| C-1 | Prepolymer 6 (A) | 4.5 | 0.34 |
| | Vancryl™ 937 (B) | 16.8 | |
| | Fused Silica | 2.0 | |
| C-2 | Prepolymer 6 (A) | 4.5 | 0.44 |
| | Luphen™ 3528 (B) | 20 | |
| | Fused Silica | 2.0 | |
| 6 | Prepolymer 6 (A) | 4.5 | 1.12 |
| | Hauthane™ HD-2334 (B) | 18.0 | |
| | Fused Silica | 2.0 | |
| 7 | Prepolymer 6 (A) | 4.5 | 2.08 |
| | NeoPac™ R-9699 (B) | 20 | |
| | Fused Silica | 2.0 | |
| 8 | Prepolymer 6 (A) | 4.5 | 1.23 |
| | Hybridur™ 580 (B) | 20 | |
| | Fused Silica | 2.0 | |

Vancryl™ 937 is a 46% solids styrene-acrylic based emulsion (having no isocyanate-reactive groups) available from Air Products, USA.

Luphen™ 3528 is a 40% solids polyurethane dispersion (having no isocyanate-reactive groups) from BASF, USA.

Hauthane™ HD-2334 is a 45% solids polyether-based polyurethane dispersion from Hauthaway & Sons Corporation.

NeoPac™ R 9699 is a 40% solids polyester-polyacrylic based polyurethane co-polymer, available from Neo Resins Canada.

Hybridur™ 580 is a 40% solids polyester-polyacrylic based polyurethane co-polymer, available from Air Products, USA.

Example 9

Liners were made by spraying component A (Prepolymer 6) which contains less than 0.1 weight percent of free TDI and component B (NeoPac™R-9699) at a weight ratio of 1:5 with 2 separate pumps and mixing components A & B in a static mixer. The compositions formed were smooth and showed higher tensile values compared to hand mixed samples. The resulting hand-made and pump-sprayed films were then tested after 4 hours to determine their tensile strengths. The strengths were also evaluated after 3 days and after several weeks. The results are shown in Table 3.

TABLE 3

| | 4 hr.* | 1 day* | 2 days* | 7 days* | 7 days** |
| --- | --- | --- | --- | --- | --- |
| Tensile Strength (MPa) | 1.8 | 9.4 | 10.9 | 12 | 15 |
| % Elongation | 700 | 406 | 310 | 252 | 225 |

*Samples were left at ambient temperature
**Samples were left at 50° C. for 2 days and then 1 day at RT.

Example 10

A test was conducted in which a control gel containing no fire retardants and samples containing several different fire retardants were ignited with an open flame. A sample prepared from 4 g of Prepolymer 1 or 2, 20 g of component NeoPac™ 9699 and 0.25–1.0 g of the expandable graphite Grafguard™ 220–80B (Graftech, Ohio, USA) showed self-extinguishability. A sample prepared with the expandable graphite Grafguard™ 160–150B also demonstrated self-extinguishability but to a lower extent.

Examples 11–14

The samples of the following examples were made by mixing 50 g of prepolymer quickly with 200 g of each dispersion using a hand-held cartridge attached to a static mixer (3M™ Mix PAC, type Dp 200-70/0499) and injecting into a stainless steel mold that was coated with fluoropolymer film (available from 3M, St. Paul, Minn., USA as 3M™ Scotch™ 5490 tape) to a thickness of 3 mm. The films were smooth and translucent. The values of tensile strength of these samples, and the components used to produce them are provided in Tables 5 and 4, respectively.

TABLE 4

| Example No. | Components of Composition | Amount (g) | Tensile Strength (MPa) After 4 hours |
|---|---|---|---|
| 11 | Prepolymer 7 (A) | 5 | 3.3 |
|  | Acronal ™ 305 D (B) | 20 |  |
| 12 | Prepolymer 7 (A) | 5 | 2.2 |
|  | NeoPac ™ 9699 (B) | 20 |  |
| 13 | Prepolymer 7 (A) | 5 | 2.4 |
|  | Acronal ™ 305 D (B) | 10 |  |
|  | NeoPac ™ 9699 (B) | 10 |  |
| 14 | Prepolymer 7 (A) | 5 | 4.7 |
|  | NeoPac ™ 9050 (B) | 20 |  |

Acronal ™ 305 D is a 50% solid acrylic-styrene based emulsion available from BASF, USA.
NeoPac ™ 9699 and NeoPac ™ 9050 contain the same polyester-polyacrylic based polyurethane co-polymer, available from Neo Resins Canada, but have solids contents of 40% and 50%, respectively.

TABLE 5

| | Tensile Strength (MPa) | | | |
|---|---|---|---|---|
| Example No. | 4 hr. | 1 day | 3 days | 5 days** |
| 11 | 3.3 | 4.8 | 7 | 7 |
| 12 | 2.2 | 6.6 | 12 | 16 |
| 13 | 2.4 | — | 7.8 | 10 |
| 14 | 4.7 | 9.5 | 11.2 | 13 |

**Samples were left at 50° C.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A liner comprising the product of reaction of:
   (a) a hydrophilic prepolymer bearing isocyanate groups that are capable of reacting with water to form a gelled mass; and
   (b) a water-borne polymer dispersion, said polymer bearing groups that are reactive to said isocyanate groups; wherein said dispersion has a sufficiently high solids content, and said polymer has a sufficiently high modulus and glass transition or crystalline melting temperature, that said product of reaction exhibits a 24-hour Tensile Strength of at least about 2.5 MPa.

2. A liner according to claim 1 which exhibits a 4-hour Tensile Strength of at least about 1 MPa.

3. A liner comprising the product of reaction of:
   (a) a hydrophilic prepolymer bearing isocyanate groups that are capable of reacting with water to form a gelled mass; and
   (b) a water-borne polymer dispersion, said polymer bearing groups that are reactive to said isocyanate groups; wherein said dispersion has a water content no greater than about 80 percent by weight, based upon the total weight of said dispersion.

4. A liner comprising the product of reaction of:
   (a) a hydrophilic prepolymer bearing isocyanate groups that are capable of reacting with water to form a gelled mass; and
   (b) a water-borne polymer dispersion, said polymer bearing groups that are reactive to said isocyanate groups; wherein said dispersion has a sufficiently high solids content, and said polymer has a sufficiently high modulus and glass transition or crystalline melting temperature, that said product of reaction exhibits a 4-hour Tensile Strength of at least about 1 MPa.

5. A liner according to claim 1 or claim 4, wherein said polymer used in component (b) has a molecular weight in the range of at least about 50,000.

6. A liner according to claim 1 or claim 4, wherein said polymer of component (b) is in the form of particles of a size from about 10 to about 10,000 nm.

7. A liner according to claim 1 or claim 4, wherein said dispersion has a solids content of at least about 30 percent by weight, based upon the total weight of said dispersion.

8. A liner according to claim 1 or claim 4, wherein a film prepared from said polymer used in component (b) has a tensile modulus of at least about 6.89 MPa at 100% elongation.

9. A liner according to claim 1 or claim 4, wherein a film prepared from said polymer used in component (b) has a value of $T_g$ or $T_m$ greater than about 30° C.

10. A liner according to claim 1 or claim 4, wherein said dispersion contains no co-solvent.

11. A liner according to claim 1 or claim 4, wherein said prepolymer is formed by reacting a polymer bearing hydroxyl groups with a monomeric polyisacyanate to form a urethane-containing polymer bearing isocyanate groups, which is purified by removing unreacted monomeric polyisocyanate or by quenching unreacted monomeric polyisocyanate with a compound that is reactive to isocyanate groups.

12. A liner according to claim 1 or claim 4, wherein said polymer dispersion is selected from the group consisting of polyurethane dispersions and poly(styrene-acrylic) dispersions.

13. A liner according to claim 12, wherein said polymer dispersion is a polyurethane dispersion.

14. A liner according to claim 13, wherein said polyurethane dispersion is a polyurethane-polyacrylic dispersion.

15. A liner according to claim 1 or claim 4, wherein said polymer dispersion is in admixture with a dispersion of an acrylic polymer, a styrene-butadiene copolymer, or a vinyl acetate polymer.

16. A liner according to claim 1 or claim 4, wherein the weight ratio of component (a) to component (b) is in the range of about 1:3 to about 1:10.

17. The liner of claim 1, claim 3, or claim 4, wherein said liner has a thickness in the range of from about 0.5 mm to about 6 mm.

18. The liner of claim 1, claim 3, or claim 4, wherein said prepolymer is derived from at least one polyether polyol.

19. The liner of claim 18, wherein said polyether polyol is trifunctional.

20. The liner of claim 1, claim 3, or claim 4, wherein said groups that are reactive to said isocyanate groups are amino groups.

21. A liner comprising the product of reaction of:
   (a) a hydrophilic prepolymer bearing isocyanate groups; and
   (b) a water-borne polyurethane-polyacrylic or poly(styrene-acrylic) dispersion, said polyurethane-polyacrylic or poly(styrene-acrylic) bearing groups that are reactive to said isocyanate groups.

22. A liner according to claim 21 wherein said liner further comprises expandable graphite.

23. A liner according to claim 21 wherein said prepolymer is derived from at least one polyether polyol and said isocyanate groups are derived from at least one aromatic polyisocyanate.

24. A liner according to claim 21 wherein said dispersion is a polyurethane-polyacrylic dispersion.

25. A method for providing a surface with a liner, said method comprising
   (a) applying to said surface
      (1) a hydrophilic prepolymer bearing isocyanate groups that are capable of reacting with water to form a gelled mass, and
      (2) a water-borne polymer dispersion, said polymer bearing groups that are reactive to said isocyanate groups; and
   (b) allowing said components (1) and (2) to react to form said liner; wherein said dispersion has a sufficiently high solids content, and said polymer has a sufficiently high modulus and glass transition or crystalline melting temperature, that said liner exhibits a 24-hour Tensile Strength of at least about 2.5 MPa.

26. A method according to claim 25, wherein said liner exhibits a 4-hour Tensile Strength of at least about 1 MPa.

27. A method for providing a surface with a liner, said method comprising
   (a) applying to said surface
      (1) a hydrophilic prepolymer bearing isocyanate groups that arc capable of reacting with water to form a gelled mass; and
      (2) a water-borne polymer dispersion, said polymer bearing groups that are reactive to said isocyanate groups; and
   (b) allowing said components (1) and (2) to react to form said liner; wherein said dispersion has a water content no greater than about 80 percent by weight, based upon the total weight of said dispersion.

28. A method for providing a surface with a liner, said method comprising
   (a) applying to said surface
      (1) a hydrophilic prepolymer bearing isocyanate groups that are capable of reacting with water to form a gelled mass, and
      (2) a water-borne polymer dispersion, said polymer bearing groups that are reactive to said isocyanate groups; and
   (b) allowing said components (1) and (2) to react to form said liner; wherein said dispersion has a sufficiently high solids content, and said polymer has a sufficiently high modulus and glass transition or crystalline melting temperature, that said liner exhibits a 4-hour Tensile Strength of at least about 1 MPa.

29. A method according to claim 25 or claim 28, wherein said polymer used in component (2) has a molecular weight in the range of at least about 50,000.

30. A method according to claim 25 or claim 28, wherein said polymer of component (2) is in the form of particles of a size from about 10 to about 10,000 nm.

31. A method according to claim 25 or claim 28, wherein said dispersion has a solids content of at least about 30 percent by weight, based upon the total weight of the dispersion.

32. A method according to claim 25 or claim 28, wherein a film prepared from said polymer of component (2) has a tensile modulus of at least about 6.89 MPa at 100% elongation.

33. A method according to claim 25 or claim 28, wherein a film prepared from said polymer of component (2) has a value of $T_g$ or $T_m$ greater than about 30° C.

34. A method according to claim 25 or claim 28, wherein said dispersion contains no co-solvent.

35. A method according to claim 25 or claim 28, wherein said prepolymer (a) is formed by reacting a polymer bearing hydroxyl groups with a monomeric polyisocyanate to form a urethane-containing polymer bearing isocyanate groups, which is purified by removing unreacted monomeric polyisocyanate or by quenching unreacted monomeric polyisocyanate with a compound that is reactive to isocyanate groups.

36. A method according to claim 25 or claim 28, wherein said polymer dispersion is selected from the group consisting of polyurethane dispersions and poly(styrene-acrylic) dispersions.

37. A method according to claim 36, wherein said polymer dispersion is a polyurethane dispersion.

38. A method according to claim 37, wherein said polyurethane dispersion is a polyurethane-polyacrylic dispersion.

39. A method according to claim 25 or claim 28, wherein said polymer dispersion (2) is in admixture with a dispersion of an acrylic polymer, a styrene-butadiene copolymer, or a vinyl acetate polymer.

40. A method according to claim 25 or claim 28, wherein the weight ratio of component (1) to component (2) is in the range of from about 1:3 to about 1:10.

41. A method according to claim 25, claim 27, or claim 28, wherein the thickness of said liner is in the range of from about 0.5 mm to about 6 mm.

42. A method according to claim 25, claim 27, or claim 28, wherein said surface is in a mine opening.

43. The method of claim 25, claim 27, or claim 28, wherein said prepolymer is derived from at least one polyether polyol.

44. The method of claim 43, wherein said polyether polyol is trifunctional.

45. The method of claim 25, claim 27, or claim 28, wherein said groups that are reactive to said isocyanate groups are amino groups.

46. A method for providing a surface with a liner, said method comprising
   (a) applying to said surface
      (1) a hydrophilic prepolymer bearing isocyanate groups; and
      (2) a water-borne polyurethane-polyacrylic or poly(styrene-acrylic) dispersion, said polyurethane-polyacrylic or poly(styrene-acrylic) bearing groups that are reactive to said isocyanate groups; and
   (b) allowing said components (1) and (2) to react to form said liner.

47. A method according to claim 46 wherein said liner further comprises expandable graphite.

48. A method according to claim 46 wherein said prepolymer is derived from at least one polyether polyol and said isocyanate groups are derived from at least one aromatic polyisocyanate.

49. A method according to claim 46 wherein said dispersion is a polyurethane-polyacrylic dispersion.

* * * * *

UNITED STATES PATENT AND TRADEMARK OFFICE
CERTIFICATE OF CORRECTION

PATENT NO. : 7,011,865 B2
APPLICATION NO. : 10/236541
DATED : March 14, 2006
INVENTOR(S) : Ashok Sengupta It is certified that error appears in the above-identified patent and that said Letters Patent is hereby corrected as shown below:

Title Page, Item (56)
Page 2 - Column 2, (Foreign Patent Documents)
Line 18 - Delete "WO 02/0649692" and insert -- WO 02/064692 --, therefor.

Column 1-2,
Line 62-67 (Col. 1) 1-3 (Col. 2) - Below "and" delete "the terms.........(1.5 inches)." and insert the same at line 62 as the continuation of paragraph.

Column 3,
Line 49-50 - Delete "U.S. Pat. No. 10 4,876,302," and insert -- U.S. Pat. No. 4,876,302, --, therefor.

Column 7,
Line 45-52 (Approx.) - Below "diisocyanate." delete "Polymeric polyisocyanates......... (1967)." and insert the same at line 44 (Approx.) as the continuation of paragraph.

Column 10,
Line 34-43 (Approx.) - Below "end." delete "A leading.........the cylinders." and insert the same at line 33 (Approx.) as the continuation of paragraph.

Column 14,
Line 12 - Delete "R 9699" and insert -- R-9699 --, therefor.

Column 16,
Line 28 - In Claim 11, delete "polyisacyanate" and insert -- polyisocyanate --, therefor.

UNITED STATES PATENT AND TRADEMARK OFFICE
CERTIFICATE OF CORRECTION

PATENT NO. : 7,011,865 B2
APPLICATION NO. : 10/236541
DATED : March 14, 2006
INVENTOR(S) : Ashok Sengupta It is certified that error appears in the above-identified patent and that said Letters Patent is hereby corrected as shown below:

Column 17,
Line 28 - In Claim 27, delete "arc" and insert -- are --, therefor.

Signed and Sealed this

Thirteenth Day of March, 2007

JON W. DUDAS
*Director of the United States Patent and Trademark Office*